United States Patent Office 2,774,756
Patented Dec. 18, 1956

2,774,756

NEW TRIAZINE COMPOUNDS AND PROCESS OF MAKING THEM

Hermann Bretschneider and Wilhelm Klötzer, Innsbruck, Austria, assignors to Osterreichische Stickstoffwerke Aktiengesellschaft, Linz (Danube), Austria, an Austrian joint-stock company No Drawing. Application March 20, 1953, Serial No. 343,802

Claims priority, application Austria March 20, 1952

7 Claims. (Cl. 260—239.7)

The present invention relates to 2-(arylsulfonamido)-1,3,5-triazins and to a process of producing the same.

It is an object of the invention to provide new products of the triazine class which are especially adapted for pharmaceutical use.

A further object of the invention is to provide new therapeutically active compounds which are very effective against bacteria and which have only a minimal toxicity.

Another object of the invention is to provide new compounds from which therapeutically active salts with alkali metals and with organic bases can be produced.

Still another object of the invention is to provide an improved method of producing the above mentioned new compounds which are especially adapted for pharmaceutical use, by which process the very easily obtainable starting materials can be reacted with each other in a convenient manner.

Further objects appear in the specification and in the claims.

Among the therapeutically suitable derivatives of 4-aminobenzene-sulfonamide particularly the $N_1$-heterocyclically substituted representatives and among these such compounds which contain a pyridine, thiazole, thiodiazole, isoxazole or diazine nucleus have proved excellent. As compounds of the class of 1,3,5-triazines up to the present time only a 2-(sulfanilamido)-4-6-diamino-1,3,5-triazine is known in which, however, the aminogroups present in the heterocyclic radical show a dystherapeutic effect (cf. Northey, The Sulfonamides, p. 84). An attempt made to recover the unsubstituted 2-(sulfanilamido)-1,3,5-s-triazine according to the most conventional method by reacting amino-s-triazine wtih 4-acetyl-aminobenzene-sulfo-chloride failed because of the instability of the triazine nucleus under the conditions of condensation, whereby a decomposition of the nucleus occurred and, besides other compounds, sulfaguanidine was formed (Roblin, Amer. Soc. 64, 2902; 1942).

According to the present invention in a surprisingly simple manner new 2-arylsulfonamido-1,3,5-triazines can be obtained which are substituted in the triazine nucleus by alkoxy-groups ($R_1$, $R_2$) and which correspond to the general formula

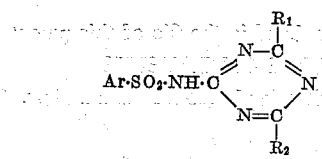

The method according to the present invention comprises the reaction of arylsulfonamides in the form of salts, preferably alkali salts, with alkoxy- or aryloxytriazines respectively, having the general formula

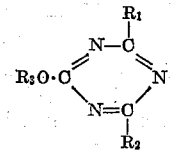

in which formula $R_1$ and $R_2$ represent the above mentioned radicals and $R_3$ means an alkyl or aryl group, whereby the corresponding alcohols or phenols ($R_3OH$) are split off. The reaction in the case of the sodium salt may be described as follows:

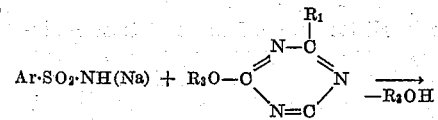

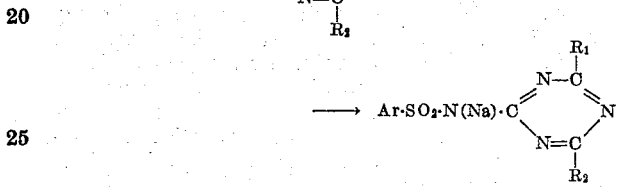

The present method of producing new derivatives of heterocyclically substituted sulfonamides offers particular technological advantages relating to the possibility of manufacturing the heterocyclic component as well as to the introduction of said heterocyclic component into the sulfonamido group. On the one hand many derivatives of 1,3,5-triazine can be obtained very easily, for instance the 2,4,6-trimethoxy-s- triazine from bromine cyanide and sodium methylate (cf. Beilstein XXVI., p. 126; on the other hand none of the often required expensive condensing agents are needed for the condensation, and finally this condensation may be effected as desired with various substrates.

The production of compounds of the 4-amino-arylsulfonamide group, respectively, for instance, which were assumed to have a particular therapeutic effect, may be brought about by different ways. It is possible to react the sulfonamido group of arylsulfonamides substituted in the aryl nucleus in 4-position by a non-basic nitrogen containing group, with the triazine derivative; then by conversion of the masked amino group in the resulting triazine derivatives the desired basic 4-amino group respectively, is obtained. As examples for such non-basic substituents (masked amino groups) which are present in the arylsulfonamide to be coupled and which can be converted into basic groups, may be mentioned acylamino, nitro and cyanide groups.

When the non-basic nitrogen containing group is designated with Y, the desired basic 4-amino group respectively, with Z, the triazine radical with T and the 1,3,5-triazine ether with $R_3OT$, the aforementioned stages of reaction may be described as follows:

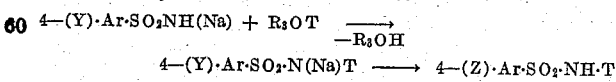

However, the reaction set forth above surprisingly shows such a specifity, that the splitting off of the alcohol or phenol, respectively, from the two components occurs exclusivley with the reactive hydrogen atom of the sulfonamide group; while other reactive hydrogen atoms which may be present, for instance hydrogen atoms of amino groups attached to the benzene nucleus, do not undergo reaction. Therefrom sometimes a further advantage of the process according to the present invention results, because, for instance, 4-aminobenzene-sulfonamide may be substituted by the triazine radical also in a one-stage reaction. This reaction may be described as follows, when the characters given above are used and the salt forming, cationic component is sodium:

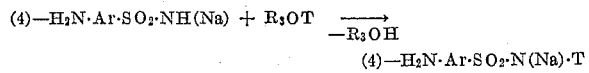

The separation of non-reacted starting material, if necessary, may be effected in a suitable manner, for instance according to the different acidities of the single components.

The bacteriological and pharmacological test of the products of the triazine group obtained according to the present invention, as for instance 2-(4'-amino-benzenesulfonamido)-4,6-dimethoxy-triazine, showed these new compounds to be valuable therapeutic agents. Thus the compound, 2 - (4'-amino - benzenesulfonamido) - 4,6 - dimethoxy-triazine in all tests proved to be at least equivalent to the best, presumably more expensive sulfonamides of the diazines in respect of the action on bacteria, whereas the toxic effect of said compound is essentially lower. In comparison with the representatives of the diazines the 2-(4'-amino-benzenesulfonamido)-4,6-dimethoxy-triazine has the therapeutically most important advantage that it is possible to produce up to over 30 percent solutions of the sodium salt or the diethanol amine salt at room temperature which are completely neutral (pH=7). By this property said sodium salt solutions are more suitable for a safe application in all parenteral ways than the by far more alkaline solutions of the sodium salts of other preparations proved to be good per se otherwise; thus for solutions of sulfathiazole sodium or sulfapyridine sodium respectively, a pH value is quoted amounting from 11.5 to 12.5 (Vonkennel, Deutsch-med. Wochenschrift 39, 954, 1942). However, it is also possible to recover by means of organic bases, as e. g. 4-aminomethylbenzenesulfonamide, well crystallized salts having a convenient, very low solubility for their local range of application.

Example 1

19.4 g. of sodium sulfanilamide are refluxed for 24 hours with 17.2 g. trimethoxy-s-triazine in 100 cc. of methyl alcohol solution, containing 0.23 g. Na as methylate. After distilling off the solvent, the residue is dissolved in water and adjusted to sodium-carbonate alkaline reaction, whereby 3 g. of sulfanilamide are separated. On subsequent neutralization of the mother liquor 23.4 g. of 2-sulfanilamido-4,6-dimethoxy-s-triazine (M. P.=134—138° C.)

are obtained. By recrystallization with acetic acid 20–21 g. of this product are obtained in pure form (M. P.=137—141° C.).

Example 2

2.14 g. of acetyl-sulfanilamide are mixed with a solution of 0.23 g. sodium in 20 cc. of methyl alcohol and then 1.72 g. of trimethoxy-s-triazine are added. After heating for 6 hours under reflux conditions the solvent is distilled off and the obtained residue is mixed with 30 cc. of water whereby 145. g. of trimethoxy-triazine are obtained. The filtrate is adjusted to sodium-carbonate alkaline reaction and 1.25 g. of N4-acetylsulfanilamide are separated. From the acidified mother liquor 0.4 g. of 2 - (N4-acetylsulfanilamido) - 4,6 - dimethoxy-triazine (M. P.=209—211° C.) are obtained.

By acylating the product of Example 1 in the usual manner a product of the same melting point is obtained as the product according to Example 2. A mixed sample of the two products shows no lowering of the melting point.

Example 3

3.29 g. of 2-sulfanilamido-4,6-dimethoxy-s-triazine (A) are charged into 15 cc. of absolute methanol containing in solution 0.23 g. of sodium, and filtered from the slightly turbid solution, with a subsequent addition of ether. The sodium salt of the compound (A) charged is obtained in a quantitative yield. The compound is soluble with pH 7 in water of 20° C., by more than 30%.

Example 4

1.645 g. of 2-sulfanilamido-4,6-dimethoxy-s-triazine are dissolved hot in 7 cc. of absolute methanol and a hot solution of 0.94 g. of 4-aminomethylbenzenesulfonamide is added. Upon cooling and addition of ether the 4-aminomethyl-sulfanilamide salt of (A) crystallizes out in a quantitative yield. The compound melts at 173–174° C., is neutrally soluble by 1.7% in water of 20° C. and has valuable antibacterial properties.

We claim:

1. A 2-(benzenesulfonamido)-1,3,5-triazine selected from the group consisting of 2-(4'-aminobenzenesulfonamido)-4,6-dimethoxy-s-triazine and its salts.

2. In a process for the production of a 2-(benzenesulfonamido)-1,3,5-triazine selected from the group consisting of 2 - (4'-aminobenzenesulfonamido) - 4,6-dimethoxy-s-triazine and its salts, the steps which comprise reacting an alkali metal salt of a benzene sulfonamide of the formula

with 2,4,6-trimethoxy triazine, whereby methanol is split off and then treating the thus obtained alkali metal salt of 2 - (4'-aminobenzenesulfonamido) - 4,6-dimethoxy-s-triazine with an acid to produce the free 2-(4'-aminobenzenesulfonamido)-4,6-dimethoxy-s-triazine.

3. The process of claim 1 which comprises reacting the free 2-(4'-aminobenzenesulfonamido)-4,6-dimethoxy-s-triazine with a sodium alcoholate to form the sodium salt of 2-(4'-aminobenzenesulfonamido)-4,6-dimethoxy-s-triazine and precipitating such sodium salt by addition of ether.

4. The process of claim 1 which comprises reacting the free 2-(4'-aminobenzenesulfonamido)-4,6-dimethoxy-s-triazine with 4-aminomethylbenzenesulfonamide in alcoholic solution to form the 4-aminomethylbenzenesulfonamido salt of 2-(4'-aminobenzenesulfonamido)-4,6-dimethoxy-s-triazine and precipitating such salt by the addition of ether.

5. 2 - (4'-aminobenzenesulfonamido)-4,6-dimethoxy-s-triazine.

6. The sodium salt of 2-(4'-aminobenzenesulfonamido)-4,6-dimethoxy-s-triazine.

7. The 4-aminomethylbenzenesulfonamido salt of 2 - (4' - aminobenzenesulfonamido) - 4,6 - dimethoxy-s-triazine.

References Cited in the file of this patent

FOREIGN PATENTS 244,348    Switzerland _____ Apr. 1, 1947